UNITED STATES PATENT OFFICE 2,708,651
Patented May 17, 1955

2,708,651

WATER-SOLUBLE ESTERS OF PREGNANOLONES

Gerald D. Laubach, Jackson Heights, N. Y., assignor to Chas. Pfizer & Co., Inc., New York, N. Y., a corporation of Delaware No Drawing. Application January 7, 1955,
Serial No. 480,614

14 Claims. (Cl. 167—52)

This invention is concerned with certain novel steroid compounds. In particular it is concerned with certain novel steroid compounds which are hormonally inactive and useful as central nervous system depressants, especially as anesthetic agents.

This application is a continuation-in-part of application Serial No. 463,805, filed on October 21, 1954, by Gerald D. Laubach, and now abandoned.

The compounds of this invention are the first steroids of practical utility as central nervous system depressants, and they are particularly useful as anesthetic agents, since they have advantages over any previously known anesthetic. This invention comprises the unexpected discovery that central nervous system depressants may be prepared by making certain hormonally inactive steroids water-soluble through the addition of an ionic group of a particular kind. While there are some variations in the effects of these compounds depending upon the individual ionic group, and while water-solubility is needed for utility, the pharmacological activity of the molecule is a function of the steroid nucleus primarily, and the ionic group serves chiefly to make the molecule water-soluble. This invention, therefore, comprises a central nervous system depressant which is a steroid made water-soluble by the addition of an ionic group. Addition of this ionic group at the 3 and/or 21 position of the steroid molecule is particularly useful.

Especially of value are compounds which have the following generic formula

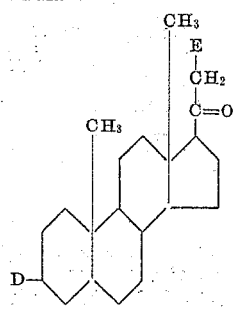

in which D and E have meanings to be defined below. This generic formula includes both compounds of the pregnane series and also compounds of the allopregnane series, i. e. compounds of the formula

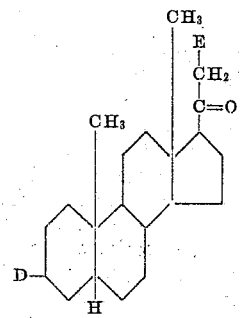

and also compounds of the formula

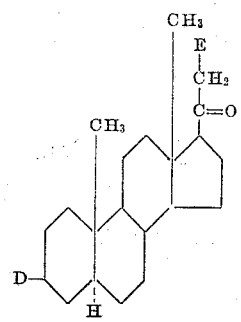

D may be a monovalent group, and it may be a divalent group. When D is monovalent, of course there is also a hydrogen atom at the 3 position, but when D is a divalent group, there is no hydrogen.

D and/or E is a polar group which is a salt of an acid ester of a polycarboxylic acid, or a salt of an amino acid ester. In this application the term "ionic ester" is used to describe this type of group. There are two kinds of "ionic esters," each of which is defined below.

The first kind of "ionic ester" has the formula

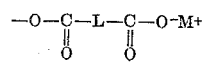

in which L is chosen from the group consisting of $$-(CH_2)_n-, \quad -O-(CH_2)_n-$$

and $-NH-(CH_2)_n-$, $n$ being a number from 1 to 6, and $M^+$ is a cation selected from the class consisting of $Na^+$, $K^+$, $NH_4^+$ and derivatives of the ammonium ion in which the substituents are chosen from alkyl, hydroxyalkyl, acyloxyalkyl, aminoalkyl, aryl and aralkyl groups containing up to 10 carbon atoms in each group. The following formulas will illustrate some of the various derivatives of the ammonium ion.

$N^+H_3CH_3$
$N^+H_2(C_2H_5)_2$
$N^+HCH_3(C_2H_5)_2$
$N^+(CH_3)_4$
$N^+H(CH_3)_2CH_2-C_6H_5$
$N^+H(C_2H_5)_2CH_2-CH_2OH$
$N^+H(C_2H_5)_2CH_2-CH_2-NH_2$

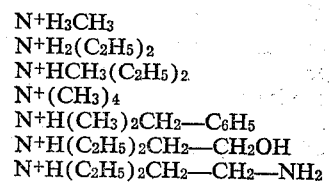

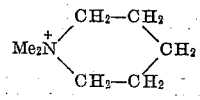

The second kind of "ionic ester" has the formula

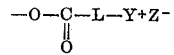

in which L is chosen from the group consisting of $$-(CH_2)_n-, \quad -O-(CH_2)_n-$$

and $-NH-(CH_2)_n-$, $n$ being a number from 1 to 6, $Y^+$ is an ammonium function substituted with groups chosen from hydrogen, alkyl, hydroxyalkyl, aminoalkyl, aryl and aralkyl groups containing up to 10 carbon atoms in each group, and $Z^-$ is a "pharmacologically acceptable anion." The following illustrate some of the various formulas for $Y^+$.

—N⁺H₃
—N⁺H(CH₃)₂
—N⁺(C₂H₅)₃
—N⁺(CH₃)₂CH₂—C₆H₅
—N⁺(C₂H₅)₂CH₂—CH₂OH
N⁺(CH₃)₂CH₂—CH₂—NH₂

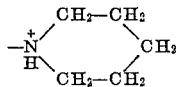

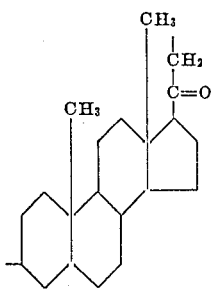

The term "pharmacologically acceptable anion" has a definite meaning to one skilled in the art. It is defined as a non-toxic anion of any of the simple acids commonly used in pharmacology to neutralize basic medicinal agents when the salt thereof is to be used therapeutically. These acids include, for example, hydrochloric, hydrobromic, hydroiodic, sulfuric, succinic and maleic. The pharmacological activity of the molecule is primarily a function of the cation, the anion serving chiefly to supply electrical neutrality.

As mentioned above, at least one ionic ester group is always in the molecule. Either D or E may be another group. E may be hydroxyl or hydrogen. D may be a keto group, a hydroxyl group or an oxime. The hydroxyl group at D or E may be esterified with non-ionic ester groups (i. e. ordinary ester groups, such as acetate or propionate, other than ionic ester groups) containing from 1 to 8 carbon atoms in the added moiety. The oxime group at D may also be esterfied with ordinary (i. e. non-ionic) ester groups, or it may be esterified with an ionic ester group. This is summarized by saying that D is selected from the group consisting of:

a. Ionic ester groups,
b. Hydroxyl and non-ionic esters thereof containing from 1 to 8 carbon atoms in the added moiety,
c. Oxime, non-ionic esters thereof containing from 1 to 8 carbon atoms in the added moiety, and ionic esters thereof, and
d. Keto and E is selected from the group consisting of:

a. Ionic ester groups,
b. Hydroxyl and non-ionic esters thereof containing from 1 to 8 carbon atoms in the added moiety, and
c. Hydrogen with at least one ionic ester group always being present in the molecule.

The ionic ester group, at least one of which is always present in each compound, renders the compounds water-soluble because of its ionic nature. As is seen from the foregoing, this group is present in any of three ways:

1. It is on the 21 position carbon;
2. It is on the 3 position carbon;
3. It is on an oxime group which is on the 3 position carbon.

Sometimes two ionic ester groups, which may be the same or different, are present, the possible combinations here being (1) and (2), and (1) and (3) above.

It has now unexpectedly been discovered that these novel compounds have properties which make them very valuable. They are central nervous system depressants, and they are hormonally inactive. They are useful as anesthetic, anti-convulsant, sedative, analgesic and hypnotic agents. Their water solubility is such that they may be administered intravenously in sterile aqueous solution. They are also suitable for administration by other routes such as orally, subcutaneously and intramuscularly.

This invention, therefore, encompasses the discovery of a process for preparing a hormonally inactive, water-soluble, central nervous system depressant, which process comprises introducing an ionic ester group at a position selected from the class consisting of 3 and 21 in a steroid having the nucleus.

Filtration through a Seitz filter is a convenient method of sterilizing a solution of a compound of this invention. The compounds may also be employed in aqueous solutions containing other solutes, for example, enough saline or glucose to make them isotonic. The compounds may be combined with a variety of pharmaceutically acceptable carriers, the choice of which will depend upon the desired method of administration. For example, the compounds may be administered orally in the form of tablets containing tablet forming material such as starch, or as an elixir or suspension in a carrier.

The methods for preparing these compounds are illustrated in the examples given below. It is to be understood that most of these examples demonstrate a general method of preparation applicable to not only the particular compound being discussed in that example but also to compounds of a similar chemical nature, for instance compounds differing in only the value of n in the formulas given above for the ionic esters, or in only the configuration at the 5 position.

There are, of course, variations in the effects of the compounds of this invention depending upon the particular substituents. Each, however, has the three common characteristics of being hormonally inactive, active as a central nervous system depressant, and water-soluble.

The following examples are given solely for the purpose of illustration, and are not to be regarded as limitations of this invention, many variations of which are possible without departing from its spirit or scope.

EXAMPLE I

*21-hydroxypregnane-3, 20-dione hemisuccinate salts*

A solution of 20 g. of desoxycorticosterone in 190 ml. of absolute ethanol was stirred in an atmosphere of hydrogen in the presence of 1.68 g. of 25% palladium on calcium carbonate catalyst. After 20 hours, approximately 1 molar equivalent of hydrogen had been absorbed and hydrogen uptake had ceased. The catalyst was removed by filtration and the filtrate evaporated in vacuo to yield 20 g. of nearly pure product, M. P. 135–40° C. The crude product was demonstrated to be free of starting material by paper chromatography. A highly purified product was obtained by recrystallization from acetone-water with cooling in an ice bath, yield 14.5 g., M. P. 152–154° C. The product was characterized by analysis and by absence of ultraviolet absorption.

A solution of 14 g. of 21-hydroxypregnane-3, 20-dione and of 14 g. of recrystallized succinic anhydride in 140 ml. of dry pyridine was allowed to stand at room temperature for 18 hours, then cooled in an ice bath and poured in a fine stream into 1.5 l. of ice water. Excess pyridine was neutralized with 3N hydrochloric acid and the solution further diluted with 2 l. of ice water. The precipitated product was filtered, washed with water and dried in vacuo at 50 C. affording 18 g. of solid M. P. 192–195° C. Recrystallization of a small sample afforded analytically pure material, M. P. 200° C.

The N,N′ tetramethyl hexamethylenediamine salt of the hemisuccinate was prepared as a clear solution by adding 200 mg. of the hemisuccinate to 188 mg. of the diamine and adding the mixture to 10 ml. of water. The salt as a white solid was obtained by lyophilization.

The dimethylamino ethanol, diethylamino ethanol, dimethylbenzylamine, trimethylamine, procaine and triethylamine salts of 21-hydroxypregnane-3,20-dione hemisuccinate were all prepared by a similar procedure, namely addition of 1 molar equivalent of the amine and dilution of the resulting clear colorless solution to 50 mg./ml. with distilled water. Alternatively, clear, colorless solutions were prepared by using molar equivalents of 21-hydroxypregnane-3,20-dione sodium salt and the amine hydrochlorides.

EXAMPLE II

*21-hydroxypregnane-3,20-dione sodium hemisuccinate*

To a dry mixture of 10 g. of the hemisuccinate of Example I and 1.867 g. of sodium bicarbonate was added, in small portions, 200 ml. of water with slight heating and evacuation. A clear, essentially colorless solution of the sodium salt resulted. The solution was sterilized by filtration through a Seitz filter after addition of Super-cel and the filtrate was then lyophilized at high vacuum. The fluffy white sodium salt, 9.65 g., was characterized by analysis and by ultraviolet spectrum, $\epsilon_{max}$ 280=93.2.

EXAMPLE III

*21-hydroxypregnane-3,20-dione dimethylamino acetate methochloride*

To a solution of 21-hydroxypregnane-3,20-dione in pyridine was added 2 molar equivalents of chloroacetyl chloride. After 12 hours the chloroacetate was isolated by precipitation with a large volume of dilute, acidified ice water. The filtered and dried chloroacetate was reacted in dimethylformamide solution with slightly more than 1 mole of trimethylamine. Careful dilution of the reaction medium resulted in the precipitation of the desired methochloride, characterized by analysis and its ready solubility in water.

EXAMPLE IV

*3α,21-dihydroxypregnane-20-one-21-hemisuccinate salt*

One gram of 3α,21-dihydroxypregnane-20-one in 10 ml. of pyridine was allowed to react for 4 hours with 1.2 molar equivalents of succinic anhydride. The product, isolated by dilution and acidification of the reaction mixture, was characterized as the 21-mono-hemisuccinate by its ready solubility in dilute sodium bicarbonate solution and by oxidation to the 21-hemisuccinate of 21-hydroxypregnane-3,20-dione.

The disuccinate was obtained by reaction of the 3,21-dihydroxypregnane-20-one with 5 molecular equivalents of succinic anhydride at 80° C. overnight.

EXAMPLE V

*3α,21-dihydroxypregnane-20-one-21-acetate salts*

A solution of 4.4 g. of the pregnanedione 21-acetate and 300 ml. of absolute ethanol was hydrogenated over 5.24 g. of W-2 Raney nickel catalyst. After 20 hours 1 molar equivalent of hydrogen had been absorbed. The product was isolated by removal of the catalyst by filtration and evaporation of the filtrate to yield 4.6 g., M. P. 169–175° C. Recrystallization of the crude product from methanol yielded an analytical sample of the hydroxy acetate, M. P. 190.2–194.6° C., characterized by analysis and by identification of acetate and 1 carbonyl band in the infrared spectrum.

The 3-hemisuccinate was prepared from the above hydroxy acetate in excess succinic anhydride by warming in pyridine solution to 80° C. for 12 hours. The product, isolated by dilution and acidification, was collected by extraction into ether and evaporation to dryness. The crude hemisuccinate was triturated with ether to afford a crystalline product, M. P. 179–181° C., characterized by its solubility in dilute sodium bicarbonate solution.

The 3-diethylamino acetate ethochloride was prepared from the 3α-hydroxy-21-acetate by formation of the 3α-chloro acetate with chloroacetyl chloride in pyridine followed by alkylation of the crystalline chloro acetate with triethylamine. The product was characterized by analysis and by its solubility in water.

EXAMPLE VI

*Pregnane-3α-ol-20-one-3-hemisuccinate salt*

A solution of 500 mg. of pregnanolone and 500 mg. of recrystallized succinic anhydride in 5 ml. of dry pyridine was refluxed under nitrogen for 4 hours. The reddish solution was poured into ice water and neutralized with 3N hydrochloric acid. The precipitated product was separated by filtration as a white solid, weight 571 mg., M. P. 203.4–208° C. The product was characterized by ready solubility in dilute sodium bicarbonate solution.

EXAMPLE VII

*21-hydroxypregnane-3, 20-dione-β-dimethyl-aminoethyl carbonate salts*

A solution of 1.00 gram of 21-hydroxypregnane-3, 20-dione in 5 ml. of benzene was added dropwise to a cooled, stirred solution of 0.5 grams of phosgene in 5 ml. of benzene containing 1 ml. of pyridine. The solution was stirred 2 hours at 25° C. and evaporated to dryness in vacuo. The residue was 21-hydroxypregnane-3, 20-dione chloroformate. It was treated with 2 ml. of β-dimethylaminoethanol and allowed to stand 18 hours. Dilution with aqueous potassium carbonate precipitated the β-dimethylaminoethyl carbonate, which was extracted with chloroform, and, after evaporation of the chloroform, recrystallized from methanol. The compound readily formed salts and quaternary ammonium compounds. For example, it was converted to the hydrobromide with ethereal hydrogen bromide and to the methiodide with methyl iodide.

*Alternate preparation of 21-hydroxypregnane-3, 20-dione-β-dimethylaminoethyl carbonate*

Although the preferred method of making this compound is that given above, the following method is also useful. One half gram of β-chloroethyl chloroformate was added to a stirred, cooled solution of one gram of 21-hydroxypregnane-3,20-dione in 5 ml. of pyridine and the solution allowed to stand 24 hours. It was then stirred into 20 ml. of ice cold 3N sulfuric acid, and extracted three times with 15 ml. of chloroform. After washing with 1N sulfuric acid, water, and sodium bicarbonate solution, the chloroform extract was dried over anhydrous sodium sulfate and evaporated to dryness in vacuo. Trituration of the residue with ether yielded the crystalline 21-hydroxypregnane-3, 20-dione β-chloroethyl carbonate which was converted to the diethylaminoethyl carbonate by refluxing it with an alcoholic solution of diethylamine for 2 hours. The mixture was cooled, treated with saturated aqueous potassium carbonate and extracted with chloroform, which was then evaporated to give the product.

EXAMPLE VIII

*21-hydroxypregnane-3, 20-dione β-diethylaminoethyl carbamate salts*

One gram of 21-hydroxypregnane-3, 20-dione chloroformate, the preparation of which is shown in the first half of Example VII, was treated with 2 ml. of β-diethylaminoethylamine and allowed to stand for 18 hours. Dilution with aqueous potassium carbonate precipitated the β-diethylaminoethyl carbamate, which was extracted with chloroform, and, after evaporation of the chloroform, recrystallized from methanol. The compound readily formed salts and quaternary ammonium compounds. For example, it was converted to the hydrobromide with ethereal hydrogen bromide and to the methiodide with methyl iodide.

*Alternate preparation of 21-hydroxypregnane-3, 20-dione β-diethylaminoethyl carbamate*

Although the method above is preferred, another method of making this compound is as follows. One gram of 21-hydroxypregnane-3, 20-dione was dissolved in 5 ml. of dimethylformamide and treated with 0.6 gram of β-chloroethylisocyanate. After standing 18 hours, the mixture was poured into water, and the precipitated product filtered off and washed with water. The product was 21-hydroxypregnane-3, 20-dione β-chloroethyl carbamate, which was converted to the diethylaminoethyl carbamate by refluxing it with an alcoholic solution of diethylamine for 2 hours. The mixture was cooled, treated with saturated aqueous potassium carbonate and extracted with chloroform, which was evaporated to give the product.

EXAMPLE IX

*Reaction of chloroformate with hydroxy acids*

One gram of 21-hydroxypregnane-3, 20-dione chloroformate, prepared as shown in the first half of Example VII, was added to 5 ml. of pyridine containing 0.5 gram of glycollic acid, and the mixture was allowed to stand for 18 hours. It was then stirred into 20 ml. of ice cold 3N sulfuric acid, and extracted three times with 15 ml. chloroform. After washing with 1N sulfuric acid and with water, the chloroform extract was dried over anhydrous sodium sulfate and evaporated to dryness in vacuo. The resulting compound had the formula

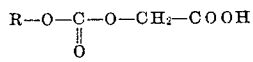

where R stands for 21-hydroxypregnane-3, 20-dione, minus its 21-OH group. Treatment of this compound with dilute sodium bicarbonate produced the corresponding sodium salt.

These reactions were also carried out in an analogous fashion, with similar results, using other hydroxy acids.

EXAMPLE X

*Reaction of chloroformate with amino acids*

Example IX was repeated, except glycine was used in place of glycollic acid. The resulting compound had the formula

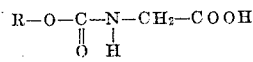

where R stands for 21-hydroxypregnane-3, 20-dione, minus its 21-OH group. Treatment of this compound with dilute sodium bicarbonate produced the corresponding sodium salt.

These reactions were also carried out in an analogous fashion, with similar results, using other amino acids.

EXAMPLE XI

*21-hydroxypregnane-3, 20-dione diethylamino acetate hydrochloride*

To a solution of 2 g. of the dried chloro acetate of 21-hydroxypregnanedione (Example III) in 20 ml. of dry pyridine was added 1 ml. of diethylamine. After standing overnight at 60° C., the solution was poured into water, neutralized with sodium bicarbonate, and extracted with methylene chloride. Evaporation of the extract afforded 21-hydroxypregnanedione diethylamino acetate as the non-crystalline free base. When the base was dissolved in ether-petroleum ether and treated with gaseous hydrochloric acid, the crystalline hydrochloride precipitated as a white solid. The assigned structure was demonstrated by the ready solubility of the product in water.

EXAMPLE XII

*21-hydroxypregnane-3, 20-dione piperadinoacetate hydrochloride*

The procedure of Example XI was repeated except that piperidine was substituted for the diethylamine.

EXAMPLE XIII

*21-hydroxypregnane-3, 20-dione diethylaminoacetate methobromide*

The free base (Example XI), 21-hydroxypregnane-3, 20-dione diethylaminoacetate was treated with excess methyl bromide at room temperature in diemethylformamide solution. Dilution of the reaction mixture resulted in the precipitation of the methobromide.

EXAMPLE XIV

*21-hydroxyallopregnane-3, 20-dione sodium hemisuccinate*

10 grams of 21-acetoxy $\Delta^5$-pregnen-3β-ol-20-one was dissolved in 50 ml. of redistilled dioxane and hydrogenated at 10 pounds per square inch pressure in the presence of 1 g. of 5% palladium-on-charcoal catalyst. The rate of uptake of hydrogen sharply decreased after the adsorbtion of one mole of hydrogen, and the hydrogenation was stopped. The catalyst was removed by filtration. Evaporation of the filtered solution to dryness afforded a white crystalline residue of 21-acetoxyallopregnan-3β-ol-20-one, which was dissolved in 40 ml. of acetic acid-benzene (1:1) and oxidized directly by slow addition at 5° C. of 1.5 molar equivalents of chromic anhydride in 25 ml. of glacial acetic acid. Evaporation of the benzene-acetic acid in vacuo to low volume and dilution with 100 ml. of water yielded crude product as a white precipitate which was recovered by filtration. Two recrystallizations from methanol afforded essentially pure 21-acetoxyallopregnanedione, M. P. 181–186° C.

The same product was obtained by an alternate procedure as follows: catalytic hydrogenation of desoxycortiosterone acetate (2 g.) over Pd(CaCo3) catalyst in 50 ml. of ethanol at atmospheric pressure afforded after removal of catalyst and solvent a crude product, M. P. 131–142° C., which was directly chromatographed over 120 g. of Florisil. From the benzene and 1:10 ether-benzene eluates was isolated 21-acetoxypregnanedione, M. P. 148–151° C. From the later benzene-ether and ether fractions was isolated by evaporation and recrystallization, 21-acetoxyallopregnanedione, M. P. 184–189° C., identical to the material prepared from 21-acetoxy $\Delta^5$-pregnen-3β-ol-20-one.

The purified 21-acetoxyallopregnane-3, 20-dione was hydrolyzed by refluxing 1 g. of it dissolved in 100 ml. of aqueous methanol containing sodium carbonate. The 21-hydroxyallopregnanedione was isolated after acidification, dilution with water, and partial evaporation. It was then dried in vacuo, dissolved in 10 ml. of dry pyridine, and reacted overnight with 1.0 g. of succinic anhydride. Dilution of the reaction mixture with dilute acid and ice, and filtration of the precipitated solid afforded 21-hydroxyallopregnanedione succinate as a mass of tiny needles.

The sodium salt was prepared by reacting 500 mg. of the crystalline succinate with one equivalent of sodium bicarbonate in 3 ml. of water. The diluted solution (20 ml.) was frozen and lyophilized at high vacuum to afford 21-hydroxyallopregnanedione sodium succinate as a white solid, which was found to be an active anesthetic on intravenous injection in experimental animals.

Similarly, other ionic esters of 21-hydroxyallopregnanedione were prepared using conditions identical to preparation of the pregnane isomers. Once the steroid nucleus had been prepared, the preparation of ionic esters, at the 21 and also at the 3 position, was the same in the allopregnane series as in the pregnane series, since the isomerism at the 5 position had no effect on these reactions.

EXAMPLE XV

*3β-hydroxyallopregnane-20-one sodium succinate*

A solution of one gram of $\Delta^{5,16}$-pregnadien-3β-ol-20-one in 50 ml. of acetic acid was hydrogenated at atmospheric pressure over one gram of an active 5% palladium-on-charcoal catalyst. After adsorbtion of 2 moles of hydrogen, the reaction was interrupted and the product 3β-hydroxyallopregnane-20-one recovered by filtration of catalyst and evaporation of the filtrate to dryness. The recrystallized product was dissolved in 10 ml. of pyridine and treated overnight with 1 g. of succinic anhydride. Dilution with 3N hydrochloric acid yielded a white precipitate of 3β-hydroxyallopregnane-20-one succinate, which was recovered by filtration.

The sodium salt was prepared by reacting the dried acid with one molar equivalent of sodium hydroxide in 10 ml. of water and lyophilization to a white solid.

EXAMPLE XVI

*Pharmacological testing of typical compounds with mice*

*21-hydroxypregnane-3, 20-dione sodium hemisuccinate.*—When this compound, in sterile aqueous solution was injected intravenously into mice, a dosage of 21.7 mg./kilogram body weight was sufficient to produce hypnosis in 50%. This is summarized by saying that $HD_{50}=21.7$ mg./kg. The lethal dosage required to kill 50% ($LD_{50}$) was 250 mg./kg. This means that the therapeutic ratio (TR), which is the ratio of $LD_{50}$ to $HD_{50}$, was 11.5. (The therapeutic ratio of the well known hypnotic agent sodium pentothal is approximately 5.)

When administered subcutaneously, the $HD_{50}$ of this novel compound was approximately 35 mg./kg. By the oral route, the $HD_{50}$ was 100 mg./kg.

A further advantage of this compound lies in the fact that animals anesthetized with it recover with a minimum of post-anesthetic depression.

*3α-hydroxypregnane-20-one-sodium hemisuccinate.*—When injected intravenously in a sterile aqueous solution, the $HD_{50}$ of this novel compound was 29 mg.kg. The $LD_{50}$ was approximately 115 mg./kg., and the therapeutic ratio was therefore approximately 4.

By the oral route, the $HD_{50}$ was approximately 100 mg./kg.

*21-hydroxypregnane-3, 20-dione-procaine hemisuccinate.*—When injected intravenously in a sterile aqueous solution the $HD_{50}$ of this novel compound was approximately 37 mg./kg. By the oral route, the $HD_{50}$ was approximately 100 mg./kg.

*21-hydroxy-3, 20-dione-diethylaminoethanol hemisuccinate.*—This compound, intravenously, produced anesthetic effect in dosages as low as 25 mg./kg. Orally, anesthetic effect was produced by dosages as low as 125 mg./kg.

*21-hydroxypregnane-3, 20-dione dimethylbenzylamine hemisuccinate.*—Intravenously, the $HD_{50}$ of this compound was 19 mg./kg. Orally, it produced anesthetic effect in dosages as low as 125 mg./kg.

*21-hydroxypregnane-3, 20-dione triethylamine hemisuccinate.*—Intravenously, the $HD_{50}$ of this compound was 20 mg./kg.

EXAMPLE XVII

*Pharmacological testing with dogs*

Dogs given intravenous injection of 50 to 100 mg. of 21-hydroxypregnane-3, 20-dione sodium hemisuccinate per kg. lost consciousness in an average of three to five minutes and remained in this state for 50 to 120 minutes. A total of six dogs received intravenously 50 mg. of this compound per kg. body weight. They generally remained in a state of light anesthesia and responded to pain stimulation. Two of four dogs which received 100 mg. of the compound per kg. body weight remained in a state of surgical anesthesia for approximately two hours.

A surgical operation (removal of a tumor from the chin) was performed on one dog after intravenous injection of 200 mg. of 21-hydroxypregnane-3, 20-dione sodium hemisuccinate per kg. body weight. The operation lasted about 40 minutes. The animal stood the operation well without any struggle. The dog made an uneventful recovery after the operation.

A dog which was given intravenous injection of 250 mg. of 21-hydroxypregnane-3, 20-dione sodium hemisuccinate per kg. body weight remained in a state of surgical anesthesia for approximately three hours. The animal also recovered from anesthesia.

Toxicity was also studied. One dog received daily 50 mg. per kg. and another 100 mg. per kg. of 21-hydroxypregnane-3, 20-dione sodium hemisuccinate for a period of ten days. Hypnosis or light anesthesia was observed persistently during the ten day period with the dog receiving 50 mg. of the compound per kg. The dog which received 100 mg. per kg. also went into a state of anesthesia following each daily injection. One striking phenomenon observed in these animals was that the duration of sleep remained constant during the ten day period. In other words, no tolerance to the compound was observed in these animals. At the end of ten days both dogs were sacrificed and tissues and organs were examined grossly and specimens taken for histopathological examination. Routine hematological examination including hemoglobin determination, white and red blood cell counts, liver function tests and blood chemistry of both dogs were determined both at the beginning and end of the test period. All of these findings were within normal limits of variation.

EXAMPLE XVIII

*Pharmacological testing with monkeys*

21-hydroxypregnane-3, 20-dione sodium hemisuccinate, was administered to two monkeys.

One monkey was given a dose of 50 mg./kilogram intravenously. Her eyelids drooped almost immediately and within seven minutes she was asleep. The monkey did not respond to pinching; corneal reflexes were absent. One hour following the administration of the anesthetic, she awoke and sat up; however, she was slightly ataxic. Within eight minutes, she was able to pick up a piece of apple and transport it directly to her mouth without any ataxic movements. The animal ate normally. Within seventeen minutes of awakening, the animal was completely normal. The animal's respiration and heart rate did not change from control levels during the period of anesthesia.

The second monkey received a dose of 100 mg. per kilogram. Her eyelids drooped and her muscles relaxed almost immediately following administration of the compound. Within three minutes, the animal lay still and did not respond to ear or skin pinching. The corneal reflex was absent and the eyes were fixed. After one hour and thirty-two minutes, the animal shook her head and lifted it after having her ear pinched. She was definitely drowsy and ignored food. Within four minutes, she showed a slight tremor of the facial muscles. This was accentuated when the animal tried to get up. Eight minutes after awakening, the animal was more observant, but still lay quietly. Three minutes later, she changed her position, sitting on her haunches, and she was more alert. There was no significant change in heart rate or respiratory rate and character throughout the period of the experiment.

Although the foregoing illustrative examples have been concerned with data on mice, dogs and monkeys, this is not to be construed as a limitation of this invention, the novel compounds of which are useful for administration to other animals, including human beings, and are particularly useful and valuable for use in veterinary and human surgery.

The following demonstrate preparation of some of the new intermediates for the novel end products of this invention:

*21-hydroxypregnane-3, 20-dione hemisuccinate-3-oxime*

To a solution of 860 mg. of 21-hydroxypregnane-3,20-dione hemisuccinate in 10 ml. of 200 proof alcohol containing 2 ml. of pyridine was added 140 mg. of hydroxylamine hydrochloride. The clear yellow reaction mixture was refluxed under nitrogen for 2 hours, then evaporated in vacuo to a white glass which crystallized spontaneously on trituration with 100 ml. of ice water and 40 ml. of methanol. The essentially pure oxime was obtained by filtration, weight 828 mg., M. P. 105–110° C. with decomposition. Recrystallization from isopropanol yielded an analytically pure sample, M. P. 105–109° C. with decomposition. *Anal.*—Calcd. for: N, 3.13. Found: N, 3.71.

3α,21-dihydroxypregnane-20-one

A solution of 2 g. of 21-hydroxypregnane-3, 20-dione in 85 ml. of absolute ethanol was stirred in the presence of 3 g. of W-2 Raney nickel catalyst in an atmosphere of hydrogen. After 20 hours, slightly more than 1 molar equivalent of hydrogen had been absorbed and hydrogen uptake had ceased. The catalyst was removed by filtration on super-cel and the product obtain by evaporation of the filtrate in vacuo. The product was characterized by the appearance of intense hydroxyl absorption and carbonyl absorption equivalent to only 1 ketone function in the infrared.

21-hydroxypregnane-3,20-dione acetate

A solution of 5 g. of desoxycorticosterone acetate in 155 ml. of absolute ethanol was hydrogenated in the presence of 1.25 g. of 25% palladium on calcium carbonate catalyst. After 22 hours, 1 molar equivalent of hydrogen had been absorbed and hydrogen uptake ceased. The product was obtained by removal of the catalyst by filtration and evaporation of the filtrate to dryness in vacuo, yield 4.4 g., M. P. 150–151° C . The product was characterized by absence of ultraviolet absorption at 240 mμ and by absence of starting material by paper chromatography.

3.20-pregnanedione

A solution of 50 g. of progesterone in 950 ml. of ethanol was shaken vigorously under an atmosphere of hydrogen in the presence of 5 g. of 5% palladium on carbon catalyst, adding in a slurry consisting of 4 g. of potassium hydroxide in 80 ml. of water. In less than 2 hours, approximately 1 molar equivalent of hydrogen had been absorbed and hydrogen uptake ceased. The catalyst was removed by filtration on a filter-aid, and the filtrate acidified with acetic acid and evaporated in vacuo to a small volume. Dilution of the precipitate with one liter of water and filtration afforded 53 g. of nearly pure product, M. P. 112–116° C. The crude precipitate was dissolved in 250 ml. of acetone and crystallization induced by careful addition of warm water. The pure product obtained as three crops consisted of 34 g., M. P. 119–120° C., with no ultraviolet absorption at 240 mμ.

3α-hydroxypregnane-20-one

Ten grams of pregnanedione was dissolved in 50 ml. of ethanol and hydrogenated over 5 g. of W-2 Raney nickel catalyst. The product, obtained after filtration and evaporation of the filtrate to dryness, amounted to 8.3 g., M. P. 119–126° C. Seven and two-tenths grams of the crude product was recrystallized from acetone-water and methanol to afford an analytically pure sample, M. P. 140.8–142.0° C., [α] D+98.3. Only 1 carbonyl band was observable in the infrared spectrum.

Pregnanedione 3-oxime

A solution of 2.56 g. of pregnanedione in 40 ml. of absolute ethanol containing 4 ml. of pyridine and 561 mg. of hydroxylamine hydrochloride was refluxed under nitrogen for 2 hours. Evaporation in vacuo afforded a white solid which was triturated with water and dried to yield 2.667 g. of the monoxime, M. P. 160.4–162.8° C. *Anal.*—Calcd. for $C_{21}H_{33}O_2$ N: N, 4.22; Found: N, 4.48.

The 3-hemisuccinate was prepared by warming 1 g. of the oxime and 1 g. of succinic anhydride in 10 ml. of pyridine to 80° C. for 12 hours. The product was isolated by dilution with water and acidification.

What is claimed is:

1. A compound having the formula

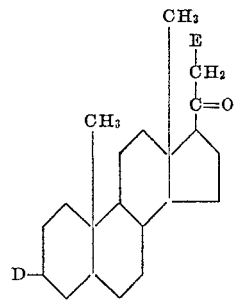

in which D is selected from the group consisting of:

(a) Ionic ester groups having the formula

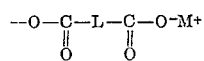

and ionic ester groups having the formula

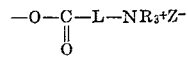

wherein L is chosen from the group consisting of —$(CH_2)_n$—, —O—$(CH_2)_n$— and —NH—$(CH_2)_n$—, $n$ being a number from 1 to 6, $M^+$ is a cation selected from the class consisting of $Na^+$, $K^+$ and $NR_4^+$, each R represents a member of the group consisting of hydrogen and alkyl, hydroxyalkyl, hydrocarbon carboxyalkyl, aminoalkyl, aryl and aralkyl groups, each containing up to ten carbon atoms, and $Z^-$ is a pharmacologically acceptable anion, (b) Hydroxyl and hydrocarbon carboxylic acid esters thereof containing from 1 to 8 carbon atoms in the added moiety, (c) Oxime, hydrocarbon carboxylic acid esters thereof containing from 1 to 8 carbon atoms in the added moiety, and ionic esters thereof as defined above, and (d) Keto, and in which E is selected from the group consisting of:

(a) Ionic ester groups as defined above, (b) Hydroxyl and hydrocarbon carboxylic acid esters thereof containing from 1 to 8 carbon atoms in the added moiety, and (c) Hydrogen, with at least one of D and E being an ionic ester group as defined above.

2. A pharmaceutical composition which comprises a compound as claimed in claim 1 together with a pharmaceutically acceptable carrier.

3. An anesthetic agent comprising a sterile aqueous solution of a compound as claimed in claim 1.

4. 21-hydroxypregnone-3, 20-dione diethylaminoacetate hydrochloride.

5. 21-hydroxypregnane-3, 20-dione sodium hemisuccinate.

6. An anesthetic agent comprising a sterile aqueous solution of the compound claimed in claim 5.

7. The triethylamine salt of 21-hydroxypregnane-3, 20-dione hemisuccinate.

8. 21-hydroxyallopregnane-3, 20-dione sodium hemisuccinate.

9. Pregnane-3α-ol-20-one-3-sodium hemisuccinate.

10. A salt of a lower hydrocarbon aliphatic aminoacid ester of 21-hydroxypregnane-3, 20-dione and a pharmacologically acceptable anion.

11. A sodium salt of an acid ester of 21-hydroxypregnane-3, 20-dione with a lower hydrocarbon aliphatic dicarboxylic acid.

12. A lower hydrocarbon substituted amine salt of an acid ester of 21-hydroxypregnane-3, 20-dione with a lower hydrocarbon aliphatic dicarboxylic acid.

13. A sodium salt of an acid ester of 21-hydroxyallopregnane-3, 20-dione with a lower hydrocarbon aliphatic dicarboxylic acid.

14. A sodium salt of an acid ester of 3-hydroxypregnane-20-one with a lower hydrocarbon aliphatic dicarboxylic acid.

References Cited in the file of this patent

UNITED STATES PATENTS

| | | |
|---|---|---|
| 2,156,275 | Butenandt | May 2, 1939 |
| 2,173,423 | Miescher | Sept. 19, 1939 |
| 2,182,920 | Hartmann | Dec. 12, 1939 |
| 2,183,589 | Reichstein | Dec. 19, 1939 |
| 2,225,662 | Schwenk | Dec. 24, 1940 |
| 2,231,017 | Marker | Feb. 11, 1941 |
| 2,231,018 | Marker | Feb. 11, 1941 |
| 2,312,483 | Reichstein | Mar. 2, 1943 |
| 2,359,862 | Linch | Oct. 10, 1944 |
| 2,429,171 | Ruzicka | Oct. 14, 1947 |
| 2,636,042 | Salkin | Apr. 21, 1953 |
| 2,660,586 | Murray | Nov. 24, 1953 |

FOREIGN PATENTS

| | | |
|---|---|---|
| 195,775 | Switzerland | May 16, 1938 |
| 206,550 | Switzerland | Nov. 16, 1939 |